(12) United States Patent
Seo et al.

(10) Patent No.: US 10,050,864 B2
(45) Date of Patent: Aug. 14, 2018

(54) OPERATION MODE TRANSITION METHOD IN NETWORK

(71) Applicant: HYUNDAI MOTOR COMPANY, Seoul (KR)

(72) Inventors: Kang Woon Seo, Seoul (KR); Jin Hwa Yun, Seoul (KR); Jun Byung Chae, Seoul (KR); Dong Ok Kim, Goyang-si (KR); Sang Woo Yu, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 26 days.

(21) Appl. No.: 15/412,669

(22) Filed: Jan. 23, 2017

(65) Prior Publication Data

US 2017/0214599 A1 Jul. 27, 2017

(30) Foreign Application Priority Data

Jan. 21, 2016 (KR) ........................ 10-2016-0007336

(51) Int. Cl.
| | | |
|---|---|---|
| *H04L 12/751* | (2013.01) | |
| *H04L 29/08* | (2006.01) | |
| *H04L 12/40* | (2006.01) | |
| *H04L 29/12* | (2006.01) | |
| *H04L 12/24* | (2006.01) | |

(52) U.S. Cl.
CPC .............. *H04L 45/02* (2013.01); *H04L 12/40* (2013.01); *H04L 41/0816* (2013.01); *H04L 61/103* (2013.01); *H04L 67/125* (2013.01); *H04L 2012/40273* (2013.01)

(58) Field of Classification Search
CPC .......... H04L 12/40; H04L 2012/40273; H04L 2012/816; H04L 45/02; H04L 61/103; H04L 67/125
USPC ........................................................ 370/254
See application file for complete search history.

(56) References Cited

U.S. PATENT DOCUMENTS

| | | | |
|---|---|---|---|
| 2009/0316572 A1* | 12/2009 | Zhang ..................... | H04L 45/00 370/220 |
| 2012/0131188 A1* | 5/2012 | Itano ....................... | H04L 12/44 709/224 |
| 2013/0007262 A1* | 1/2013 | Akatoki .................. | H04L 43/04 709/224 |
| 2015/0288567 A1* | 10/2015 | Lin ......................... | H04L 41/0856 370/254 |
| 2015/0317272 A1* | 11/2015 | Tanaka .................. | G06F 13/385 710/301 |
| 2016/0057066 A1* | 2/2016 | Gasparakis ............. | H04L 47/33 709/226 |
| 2017/0099215 A1* | 4/2017 | Arumugam ........... | H04L 45/245 |

* cited by examiner

*Primary Examiner* — Stephen J Clawson
(74) *Attorney, Agent, or Firm* — McDermott Will & Emery LLP (57) ABSTRACT

An operation method of a switch apparatus includes: obtaining configuration information of communication nodes connected to the switch apparatus; identifying ports connected to end nodes among the communication nodes based on the configuration information; identifying link statuses of the ports; and when the link statuses of the ports are a DOWN state during a predetermined period of time, changing an operation mode of the switch apparatus from a normal mode to a low-power mode.

18 Claims, 10 Drawing Sheets

OPERATION MODE TRANSITION METHOD IN NETWORK

CROSS-REFERENCE TO RELATED APPLICATION

This application claims the benefit of priority to Korean Patent Application No. 10-2016-0007336, filed on Jan. 21, 2016 in the Korean Intellectual Property Office (KIPO), the entirety of which is incorporated by reference herein.

TECHNICAL FIELD

The present disclosure relates generally to a method for converting an operation mode in network, and more specifically, to changing an operation mode between a normal node and a low-power mode in a vehicle network.

BACKGROUND

Along with the rapid digitalization of vehicle parts, the number and variety of electronic devices installed within a vehicle have been increasing significantly. Electronic devices may currently be used throughout the vehicle, such as in a power train control system, a body control system, a chassis control system, a vehicle network, a multimedia system, and the like. The power train control system may include an engine control system, an automatic transmission control system, or the like. The body control system may include a body electronic equipment control system, a convenience apparatus control system, a lamp control system, or the like. The chassis control system may include a steering apparatus control system, a brake control system, a suspension control system, or the like. The vehicle network may include a controller area network (CAN), a FlexRay-based network, a media oriented system transport (MOST)-based network, or the like. The multimedia system may include a navigation apparatus system, a telematics system, an infotainment system, or the like.

Such systems and electronic devices constituting each of the systems are connected via the vehicle network, which supports functions of the electronic devices. For instance, the CAN may support a transmission rate of up to 1 Mbps and may support automatic retransmission of colliding messages, error detection based on a cycle redundancy interface (CRC), or the like. The FlexRay-based network may support a transmission rate of up to 10 Mbps and may support simultaneous transmission of data through two channels, synchronous data transmission, or the like. The MOST-based network is a communication network for high-quality multimedia, which may support a transmission rate of up to 150 Mbps. The telematics system, the infotainment system, as well as enhanced safety systems of a vehicle require higher transmission rates and system expandability. However, the CAN, FlexRay-based network, or the like may not sufficiently support such requirements. The MOST-based network may support a higher transmission rate than the CAN and the FlexRay-based network. However, costs increase to apply the MOST-based network to all vehicle networks. Due to these limitations, an Ethernet-based network may be considered as a vehicle network. The Ethernet-based network may support bi-directional communication through one pair of windings and may support a transmission rate of up to 10 Gbps.

The Ethernet-based vehicle network may include a plurality of communication nodes. The communication node may be a gateway, a switch (or, bridge), an end node, or the like. An operation mode of the communication node may be classified into a normal mode and a low-power (or, sleep) mode. Further, the normal mode may be classified into an active mode and a passive mode. The active mode is an operation mode in which the communication mode operates by itself, and the passive mode is an operation mode in which the communication node operates according to requests of other communication nodes. The low-power mode is an operation mode in which the communication node operates with minimum power consumption or may be in a power off state.

In a case that the communication node supports a network management protocol (NMP), the communication node may change its operation mode in response to a network management (NM) frame. For example, the communication node may receive a NM frame from other communication nodes, and determine its operation mode based on information included in the received NM frame. In case that the information included in the NM frame indicates a normal mode based operation, the operation mode of the communication node may be set to the normal mode. In case that the information included in the NM frame indicates a low-power mode based operation, the operation mode of the communication node may be set to the low-power mode.

However, since the information included in the NM frame can be interpreted by a layer 3 or above (e.g., an application layer), the communication node should support a layer 3 or above in order to support operation mode transitions based on the NM frame.

SUMMARY

The present disclosure provides an operation mode transition method in a vehicle network.

In addition, the present disclosure provides a switch apparatus supporting operation mode transitions in a vehicle network.

In accordance with an exemplary embodiment of the present disclosure, an operation method of a switch apparatus in an Ethernet-based vehicle network includes: obtaining configuration information of communication nodes connected to the switch apparatus; identifying ports connected to end nodes among the communication nodes based on the configuration information; identifying link statuses of the ports; and when the link statuses of the ports are a DOWN state during a predetermined period of time, changing an operation mode of the switch apparatus from a normal mode to a low-power mode.

The configuration information may include Medium Access Control (MAC) addresses, port identifiers, and node-type information of the communication nodes.

The node-type information may indicate whether a corresponding communication node is the switch apparatus or an end node.

The configuration information may be obtained based on address resolution protocol (ARP).

The obtaining configuration information may include receiving a frame including the configuration information from a communication node in an upper level; and obtaining the configuration information from the frame.

The obtaining configuration information may include transmitting request frames requesting the configuration information to the communication nodes connected to the switch apparatus; receiving response frames including the configuration information in response to the request frames; and obtaining the configuration information from the response frames.

The switch apparatus may not support a network management protocol.

The switch apparatus may include a layer-1 and a layer-2.

When an end node connected to the switch apparatus receives a frame requesting to operate in a low-power mode, a link status between the switch apparatus and the end node may be set to the DOWN state.

The operation method may further include constructing a database in which the configuration information is stored.

The operation method may further include changing the operation mode of the switch apparatus from a low-power mode to a normal mode, when a link status of at least one of the ports connected to the end nodes is changed from the DOWN state to an UP state.

In accordance with another embodiment of the present disclosure, a switch apparatus constituting a vehicle network comprising a processor and a memory storing at least one instruction executed by the processor, wherein the execution of the at least one instruction causes the processor to obtain configuration information of communication nodes connected to the switch apparatus; identify ports connected to end nodes among the communication nodes based on the configuration information; identify link statuses of the ports; and change an operation mode the switch apparatus from a normal mode to a lower power mode, when the link statuses of the ports are a DOWN state during a predetermined period of time.

The configuration information may include Medium Access Control (MAC) addresses, port identifiers, and node-type information of the communication nodes.

The node-type information may indicate whether a corresponding communication node is the switch apparatus or an end node.

The configuration information may be obtained based on address resolution protocol (ARP).

The switch apparatus may not support a network management protocol.

The at least one instruction may be further configured to construct a database in which the configuration information is stored.

The at least one instruction may be further configured to change the operation mode of the switch apparatus from a low-power mode to a normal mode, when a link status of at least one of ports connected to the end nodes is changed from down state to UP state.

According to the exemplary embodiments of the present disclosure, a switch apparatus which does not support a layer-3 or above may change its operation mode according to link statuses of its ports. The switch apparatus operating in a normal mode may change its operation mode from the normal mode to a low-power mode, when link statuses of its own ports connected to end nodes are in a DOWN state. The switch apparatus operating a low-power mode may change its operation mode form the low-power mode to a normal mode, when a link status of at least one of ports connected to the end nodes is in an upstate.

In the case that the operation mode changes according to the link statuses, it may become unnecessary for the switch apparatus to interpret a network management (NM) frame, and thus the operation mode of the switch apparatus can be changed quickly and power consumption can be reduced. Accordingly, performance of a vehicle network can be enhanced. Also, since the switch apparition can be constructed only with layer-1 and layer-2, the vehicle network can be constructed with lower costs as compared to a case in which switch apparatuses having layer-3 or above are used.

BRIEF DESCRIPTION OF DRAWINGS

The present disclosure will become more apparent by describing in detail exemplary embodiments of the present disclosure with reference to the accompanying drawings, in which.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

Hereinafter, exemplary embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

Although exemplary embodiments are described herein as using a plurality of units to perform the exemplary process, it is understood that the exemplary processes may also be performed by one or plurality of modules. Additionally, it is understood that the term controller/control unit refers to a hardware device that includes a memory and a processor such as an electronic control unit (ECU). The memory is configured to store the modules, and the processor is specifically configured to execute said modules to perform one or more processes which are described further below. Moreover, it is understood that the units or modules described herein may embody a controller/control unit for controlling operation of the unit or module.

Further, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several embodiments, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term 'and/or' means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it be understood that a further component is not located therebetween.

Unless specifically stated or obvious from context, as used herein, the term "about" is understood as within a range of normal tolerance in the art, for example within 2 standard deviations of the mean. The term "about" can be understood as within 10%, 9%, 8%, 7%, 6%, 5° A, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, exemplary embodiments of the present disclosure will be described in detail with reference to the accompanying drawings. In describing the disclosure, to facilitate the entire understanding of the disclosure, like numbers refer to like elements throughout the description of the figures and the repetitive description thereof will be omitted.

Figure 1:
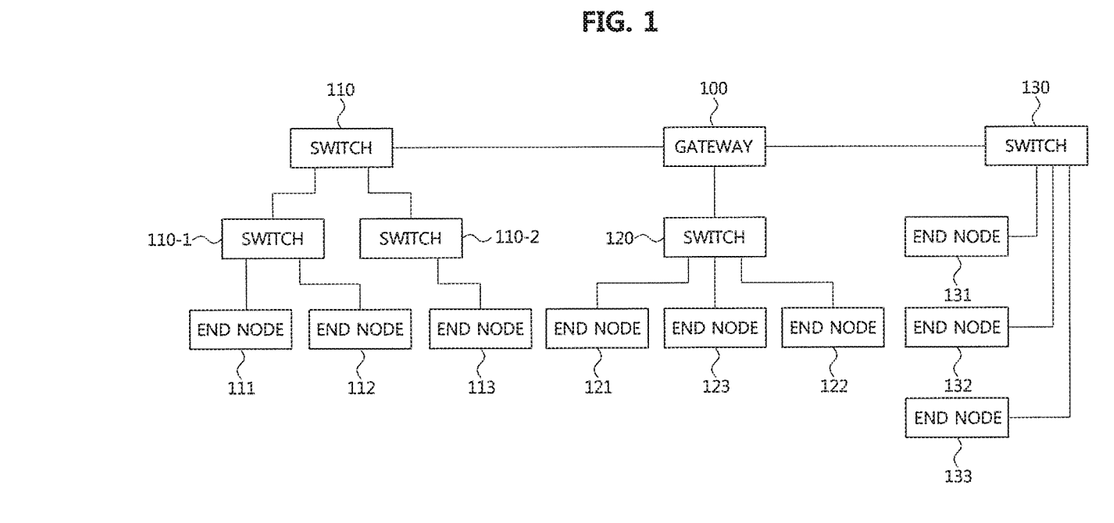
FIG. 1 is a diagram showing a vehicle network topology according to an exemplary embodiment of the present disclosure.

FIG. 1 is a diagram showing a network topology according to an exemplary embodiment of the present disclosure.

As shown in FIG. 1, a communication node included in a vehicle network may be a gateway, a switch (or bridge), or an end node. The gateway 100 may be connected with at least one switch 110, 110-1, 110-2, 120, and 130 and may be configured to connect different networks. For example, the gateway 100 may support connection between a switch which supports a controller area network (CAN) (e.g., FlexRay, media oriented system transport (MOST), or local interconnect network (LIN)) protocol and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and control at least one of end nodes 111, 112, 113, 121, 122, 123, 131, 132, and 133 connected to the switch.

The end nodes 111, 112, 113, 121, 122, 123, 131, 132, and 133 may include an electronic control unit (ECU) configured to control various types of devices mounted within a vehicle. For example, the end nodes 111, 112, 113, 121, 122, 123, 131, 132, and 133 may include the ECU included in an infotainrnent device (e.g., a display device, a navigation device, and an around view monitoring device).

The communication nodes (e.g., a gateway, a switch, an end node, or the like) included in the vehicle network may be connected in a star topology, a bus topology, a ring topology, a tree topology, a mesh topology, or the like. In addition, the communication nodes of the vehicle network may support the CAN protocol, the FlexRay protocol, the MOST protocol, the LIN protocol, or the Ethernet protocol. Exemplary embodiments of the present disclosure may be applied to the foregoing network topologies. The network topology to which an exemplary embodiment of the present disclosure may be applied is not limited thereto and may be configured in various ways.

Figure 2:
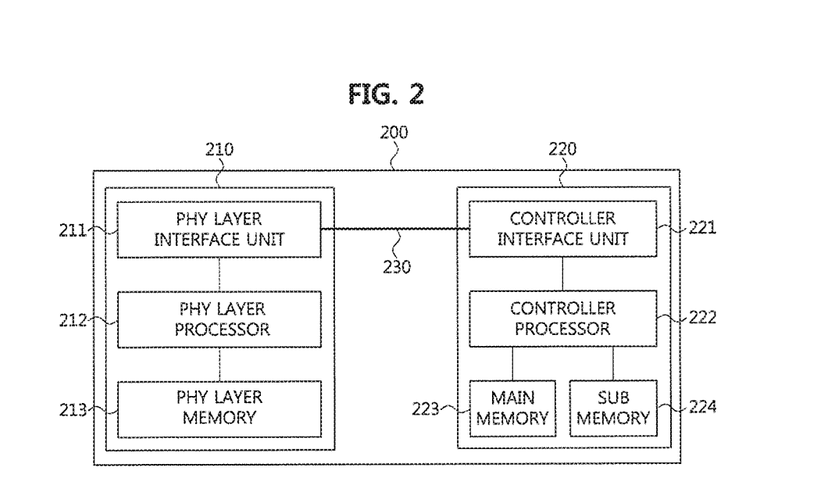
FIG. 2 is a diagram showing a communication node constituting a vehicle network according to an exemplary embodiment of the present disclosure.

FIG. 2 is a diagram showing a communication node constituting a vehicle network according to the exemplary of the present disclosure. Notably, the various methods discussed herein below may be executed by a controller having a processor and a memory.

As shown in FIG. 2, a communication node 200 of a network may include a physical layer (PHY) layer unit 210 and a controller 220. In addition, the communication node 200 may further include a regulator (not shown) for supplying power. In particular, the controller 220 may be implemented to include a medium access control (MAC) layer. The PHY layer unit 210 may be configured to receive or transmit signals from or to another communication node. The controller 220 may be configured to control the PHY layer unit 210 and perform various functions (e.g., an infotaimnent function, or the like.). The PHY layer unit 210 and the controller 220 may be implemented as one system on chip (SoC), or alternatively may be implemented as separate chips.

Further, the PHY layer unit 210 and the controller 220 may be connected via a media independent interface (MII) 230. The MII 230 may include an interface defined in the IEEE 802.3 and may include a data interface and a management interface between the PRY layer unit 210 and the controller 220. One of a reduced MII (RMII), a gigabit MII (GMII), a reduced GMII (RGMII), a serial GMII (SGMII), a 10 GMII (XGMII) may be used instead of the MII 230. A data interface may include a transmission channel and a reception channel, each of which may have an independent clock, data, and a control signal. The management interface may include a two-signal interface, one signal for the clock and one signal for the data.

Particularly, the PHY layer unit 210 may include a PHY layer interface unit 211, a PHY layer processor 212, and a PHY layer memory 213. The configuration of the PHY layer unit 210 is not limited thereto, and the PHY layer unit 210 may be configured in various ways. The PHY layer interface unit 211 may be configured to transmit a signal received from the controller 220 to the PHY layer processor 212 and transmit a signal received from the PHY layer processor 212 to the controller 220, The PRY layer processor 212 may be configured to execute operations of the PHY layer interface unit 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PRY layer processor 212.

The controller 220 may be configured to monitor and control the PHY layer unit 210 using the MII 230, The controller 220 may include a controller interface unit 221, a controller processor 222, a main memory 223, and a sub memory 224, The configuration of the controller 220 is not limited thereto, and the controller 220 may be configured in various ways. The controller interface unit 221 may be configured to receive a signal from the PHY layer unit 210 (e.g., the PRY layer interface unit 211) or an upper layer (not shown), transmit the received signal to the controller processor 222, and transmit the signal received from the controller processor 222 to the PHY layer unit 210 or upper layer. The controller processor 222 may further include an independent memory control logic or an integrated memory control logic for controlling the controller interface unit 221, the main memory 223, and the sub memory 224. The memory control logic may be implemented to be included in the main memory 223 and the sub memory 224 or may be implemented to be included in the controller processor 222.

Further, each of the main memory and the sub memory 224 may be configured to store a signal processed by the controller processor 222 and may be configured to output the stored signal based on a request from the controller processor 222. The main memory 223 may be a volatile memory (e.g., a random access memory (RAM)) configured to temporarily store data required for the operation of the controller processor 222. The sub memory 224 may be a non-volatile memory in which an operating system code (e.g., a kernel and a device driver) and an application program code for performing a function of the controller 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

A method performed by a communication node and a corresponding counterpart communication node in a vehicle network will be described below. Although the method (e.g., signal transmission or reception) performed by a first communication node will be described below, the method is applicable to a second communication node that corresponds to the first communication node. In other words, when an operation of the first communication node is described, the second communication node corresponding thereto may be configured to perform an operation that corresponds to the operation of the first communication node. Additionally, when an operation of the second communication node is described, the first communication node may be configured to perform an operation that corresponds to an operation of a switch.

Figure 3:
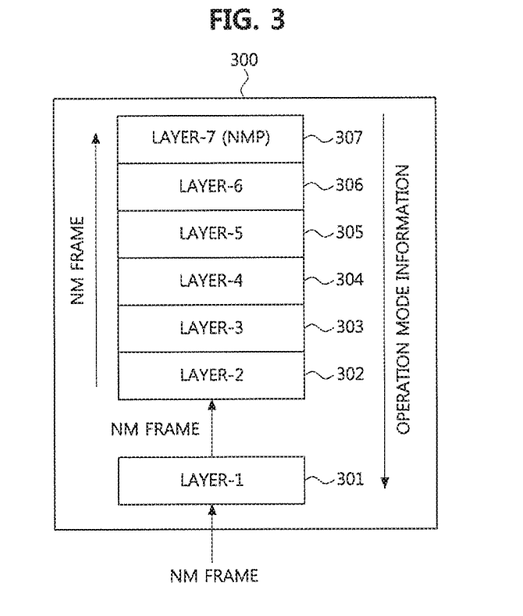
FIG. 3 is a block diagram illustrating a communication node supporting a network management protocol according to an exemplary embodiment of the present disclosure.

FIG. 3 is a block diagram illustrating a communication node supporting a network management protocol according to an exemplary embodiment of the present disclosure.

Referring to FIG. 3, a communication node 300 may be an end node, a switch (or, bridge), or a gateway which was described referring to FIG. 1. The communication node 300 may have a structure identical to or similar with that of the communication 200 described referring to FIG. 2.

The communication 300 may comprise seven layers 301, 302, 303, 304, 305, 306, and 307. The first layer (layer-1) 301 may be a PHY layer. The seventh layer (layer-7) 307 may be an application layer, and support a network management (NM) protocol. The layers constituting the communication node 300 may not be restricted to the above-described example. That is, the communication nodes may have a variety of configurations in its layer composition. For example, the communication node 300 may be configured to have only three layers 301, 302, 303. In this case, the third layer (layer-3) 303 may support the NM protocol in this case.

The first layer 301 of the communication node 300 may receive a NM frame from another communication node (e.g., from a first layer of another communication node), and transfer the received NM frame to an upper layer (e.g., the second layer 302). The NM frame may be finally transferred to the seventh layer 307 through the layers 302, 303, 304, 305, and 306 included in the communication node 300.

Since only the seventh layer 307 supports the NM protocol, it may analyze information included in the NM frame, and accordingly identify an operation mode (e.g., normal mode, low-power mode, etc.) indicated by the information included in the NM frame. The seventh layer 307 may notify information on the operation mode to other layers (e.g., the first layer 301, etc.). The information on the operation mode may be finally transferred to the first layer 301 through the layers 306, 305, 304, 303, and 302 constituting the communication node 300.

The first layer 301 may receive the information on the operation mode from upper layers. In case that a normal mode is indicated by the information on the operation mode, an operation mode of the first layer 301 may be set to a normal mode. In case that a low-power mode is indicated by the information on the operation mode, the operation mode of the first layer 301 may be set to a lower-power mode.

Figure 4:
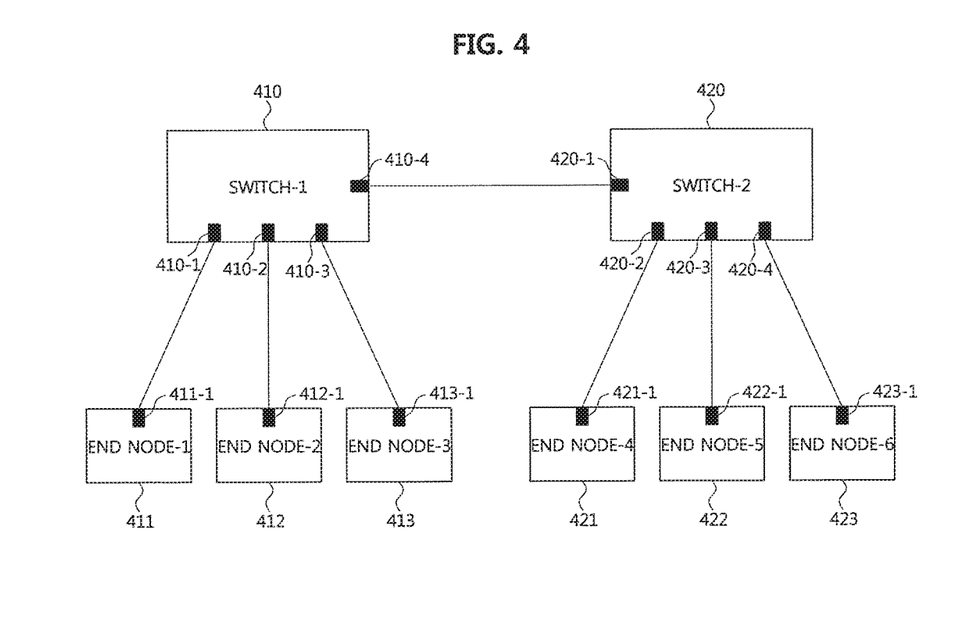
FIG. 4 is a diagram showing another vehicle network topology according to an exemplary embodiment of the present disclosure.

FIG. 4 is a diagram showing another vehicle network topology according to an exemplary embodiment of the present disclosure.

Referring to FIG. 4, a vehicle network topology may comprise a plurality of switches 410 and 420, and end nodes 411, 412, 413, 421, 422, and 423 which are respectively connected to the switches 410 and 420. Each of the switches 410 and 420, and the end nodes 411, 412, 413, 421, 422, and 433 may have a structure identical to or similar with that of the communication node 200 described referring to FIG. 2.

The first switch 410 may comprise a plurality of ports 410-1, 410-2, 410-3, and 410-4. The first port 410-1 of the switch 410 may be connected to a first port 411-1 of the first end node 411, and a link may be formed between the port 410-1 and the port 411-1. The second port 410-2 of the switch 410 may be connected to a first port 412-2 of the second end node 412, and a link may be formed between the port 410-2 and the port 412-1. The third port 410-3 of the first switch 410 may be connected to a first port 413-1 of the third end node 413, and a link may be formed between the port 410-3 and the port 413-1. The fourth port 410-4 of the switch 410 may be connected to a first port 420-1 of the switch 420, and a link may be formed between the port 410-4 and the port 420-1.

The second switch 420 may comprise a plurality of ports 420-1, 420-2, 420-3, and 420-4. The second port 420-2 of the switch 420 may be connected to a first port 421-1 of the fourth end node 421, and a link may be formed between the port 420-2 and the port 421-1. The third port 420-3 of the second switch 420 may be connected to a first port 422-1 of the fifth end node 422, and a link may be formed between the port 420-3 and the port 422-1, The fourth port 420-4 of the second switch 420 may be connected to a first port 423-1 of the sixth end node 423, and a link may be formed between the port 420-4 and the port 423-1.

Here, each of the end nodes 411, 412, 413, 421, 422, and 423 may support the NM protocol. Accordingly, each of the end nodes 411, 412, 413, 421, 422, and 423 may analyze information included in a received NM frame, and operate in an operation mode indicated by the information included in the received NM frame. The switches 410 and 420 may not support a third layer or above, and may not support the NM protocol. The switches 410 and 420 may have a structure which will be described later.

Figure 5:
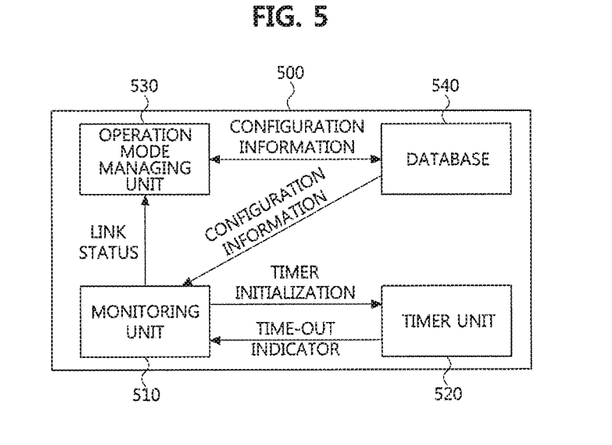
FIG. 5 is a block diagram illustrating a switch according to an exemplary embodiment of the present disclosure.

FIG. 5 is a block diagram illustrating a switch according to an exemplary embodiment of the present disclosure.

Referring to FIG. 5, a switch 500 may comprise a monitoring unit 510, a timer unit 520, an operation mode managing unit 530, and a database 540. The monitoring unit 510, the timer unit 520, the operation mode managing unit 530, and the database 540 may correspond to the controller 220 described referring to FIG. 2. The switch 500 may comprise a plurality of ports similarly with the switches 410 and 420 illustrated in FIG. 4.

The monitoring unit 510 may monitor signals transmitted or received through a port of the switch 500. The monitoring unit 510 may obtain configuration information of communication nodes connected to the switch 500 from the database 540, monitor signals transmitted and through ports connected to end nodes among communication nodes. The monitoring unit 510 may not monitor signals transmitted or received through ports connected to other switches among communication nodes.

The monitoring unit 510 may determine a link status of a port based on the monitoring result. For example, the monitoring unit 510 may determine a link status of a port as a 'UP' state when a signal is transmitted or received through the corresponding port. The monitoring unit 510 may determine a link status of a port as a 'DOWN' state when a signal is neither transmitted nor received through the corresponding port (or, when a signal having a periodicity larger than a predetermined threshold or a signal weaker than a predetermined threshold is transmitted or received through the corresponding port). The monitoring unit 510 may transfer information on link statuses of the ports to the operation mode managing unit 530.

In case that a link status of a port is determined as DOWN state, the monitoring unit 510 may request initialization of a timer to the tinier unit 520, and then receive a time-out indicator indicating expiration of the timer from the timer unit 520. According to the time-out indicator, the monitoring unit 510 may identify that the DOWN state of the port has been maintained during a predetermined period of time, and then notify it to the operation mode managing unit 530.

The timer unit 520 may have time measurement functionality. The timer unit 520 may receive the request of timer initialization from the monitoring unit 510 (or, the operation mode managing unit 530), initialize the timer according to the request, and transmit the time-out indicator to the monitoring unit 510 (or, the operation mode managing unit 530) when the timer expires.

The operation mode managing unit 530 may manage the operation mode of the switch 500. The operation mode managing unit 530 may obtain the information on link statuses from the monitoring unit 510, and maintain the operation mode of the switch 500 as a normal mode when it is identified that at least one of all links connected to end nodes is in an UP state from the obtained information on link statuses. On the contrary, the operation mode managing unit 530 may change the operation mode of the switch 500 from the normal mode to a low-power mode when it is identified that all links connected to end nodes are in a DOWN state from the obtained information on link statuses.

Here, the operation mode managing unit 530 may request initialization of a timer to the timer unit 520, and then receive a time-out indicator indicating expiration of the tinier from the timer unit 520. When it is identified all the links have been maintained at the DOWN state during a predetermined period of time from the time-out indicator, the operation mode managing unit 530 may change the operation mode of the switch 500 from the normal mode to a low-power mode.

In addition, the operation mode managing unit 530 may obtain configuration information of communication nodes connected to the ports of the switch 500. For example, the operation mode managing unit 530 may obtain the configuration information of the communication nodes by using a MAC address learning protocol (e.g., address resolution protocol (ARP), etc.). The operation mode managing unit 530 may store the configuration information in the database 540. The configuration information may include MAC addresses, port identifiers (IDs), or node type information of the communication nodes. The node type information may indicate whether the corresponding communication node is an end node or a switch.

In the below description, an operation mode transition method performed in a switch 410 constituting the vehicle network topology explained referring to FIG. 4 will be explained. The switch 410 may have a structure identical to or similar with that of the switch 500 explained referring to FIG. 5.

Figure 6:
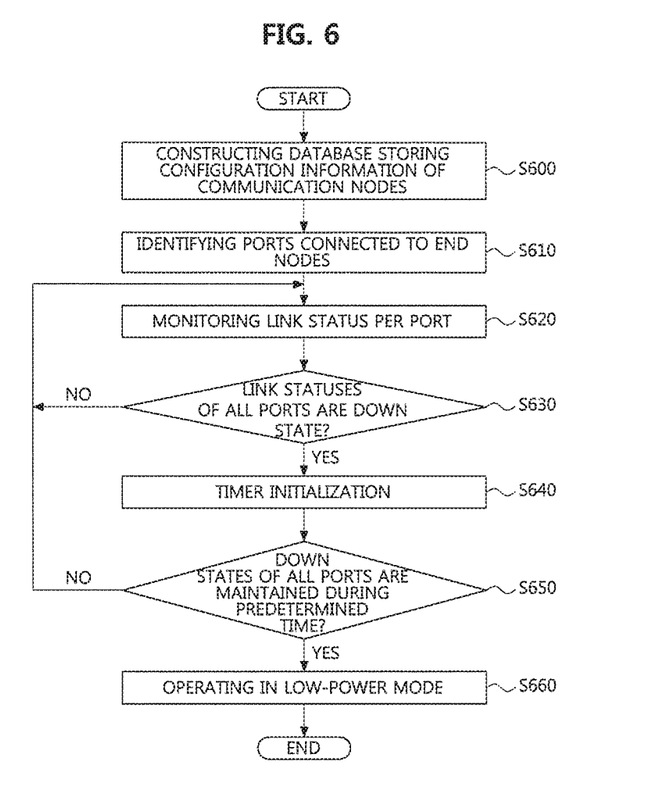
FIG. 6 is a flow chart illustrating an operation mode transition method according to an exemplary embodiment of the present disclosure.

FIG. 6 is a flow chart illustrating an operation mode transition method according to an exemplary embodiment of the present disclosure.

Referring to FIG. 6, the first switch 410 operating in a normal mode may obtain configuration information of the communication nodes 411, 412, 413, and the second switch 420 connected to the ports 410-1, 410-2, 410-3, and 410-4, and construct the database in which the configuration information is stored (S600). The configuration information may include MAC addresses, port identifiers (IDs), or node type information of the communication nodes. The node type information may indicate whether the corresponding communication node is an end node or a switch.

The switch 410 may obtain the configuration information of the communication nodes 411, 412, 413, and 420 by using one or a combination of the following manners.

First, the first switch 410 may receive a frame including the configuration information of the communication nodes 411, 412, 413, and the second switch 420 from an upper-level communication node (e.g., a gateway, etc.), and obtain the configuration information from the received frame.

Second, the first switch 410 may obtain the configuration information of the communication nodes 411, 412, 413, and the second switch 420 based on MAC address learning protocol. For example, the first switch 410 may obtain the configuration information of the communication nodes 411, 412, 413, and the second switch 420 by using ARP protocol.

Third, the first switch 410 may obtain the configuration information of the communication nodes 411, 412, 413, and the second switch 420 through a frame exchange procedure other than the MAC address learning protocol. For example, the switch 410 may transmit a request frame requesting the configuration information through the ports 410-1, 410-2, 410-3, and 410-4. When the end node 411 receives the request frame from the first switch 410, the end node 411 may generate a response frame including its MAC address, port IDs, and node-type information, and transmit the generated response frame to the first switch 410 through the corresponding port. The first switch 410 may receive the response frame through the port 410-1, and obtain the configuration information of the end node 411 from the response frame.

When the end node 412 receives the request frame from the first switch 410, the end node 412 may generate a response frame including its MAC address, port IDs, and node-type information, and transmit the generated response frame to the first switch 410 through the corresponding port. The first switch 410 may receive the response frame through the port 410-2, and obtain the configuration information of the end node 412 from the response frame. When the end node 413 receives the request frame from the first switch 410, the end node 413 may generate a response frame including its MAC address, port IDs, and node-type information, and transmit the generated response frame to the first switch 410 through the corresponding port. The first switch 410 may receive the response frame through the port 410-3, and obtain the configuration information of the end node 413 from the response frame. When the second switch 420 receives the request frame from the first switch 410, the second switch 420 may generate a response frame including its MAC address, port IDs, and node-type information, and transmit the generated response frame to the first switch 410 through the corresponding port. The first switch 410 may receive the response frame through the port 410-4, and obtain the configuration information of the second switch 420 from the response frame. Here, the procedure of obtaining the configuration information of the second switch 420 may be omitted.

The first switch 410 may identify the end nodes 411, 412, and 413 among the communication nodes 411, 412, 413, and the second switch 420 based on the communication nodes 411, 412, 413, and the second switch 420 (e.g., based on node type information included in the configuration information of the communication nodes 411, 412, 413, and the second switch 420, and identify the ports 410-1, 410-2, and 410-3 connected to the end nodes 411, 412, and 413 (S610). Here, it may be identified that the first switch 410 is connected to the end node 411 through the port 410-1, to the end node 412 through the port. 410-2, and to the end node 413 through the port 410-3.

The first switch 410 may periodically or aperiodically identify link statuses of the ports 410-1, 410-2, and 410-3 which are respectively connected to the end nodes 411, 412, and 413 (S620). The first switch 410 may not identify a link status of the port 410-4 connected to the switch 420. The first switch 410 may determine a link status of a port as a 'UP' state when a signal is transmitted or received through the corresponding port. The first switch 410 may determine a link status of a port as a 'DOWN' state when a signal is neither transmitted nor received through the corresponding port (or, when a signal having a periodicity larger than a predetermined threshold or a signal weaker than a predetermined threshold is transmitted or received through the corresponding port).

For example, the first switch 410 may determine the link status of the port 410-1 as UP state when a signal is transmitted or received through the port 410-1, determine the link status of the port 410-2 as DOWN state when a signal is transmitted or received through the port 410-2, and determine the link status of the port 410-3 as UP state when a signal is transmitted or received through the port 410-3. The first switch 410 may generate a link status table based on the determination result on link statuses as shown in the below table 1, and update the link status table when the link status of any one of the ports change.

TABLE 1

|  | Port-1 | Port-2 | Port-3 |
| --- | --- | --- | --- |
| Link status | UP | DOWN | UP |

The first switch 410 may determine whether link statuses of all the ports 410-1, 410-2, and 410-3 connected to the end nodes 411, 412, and 413 are DOWN state (S630). In case that the link statuses of all the ports 410-1, 410-2, and 410-3 connected to the end nodes 411, 412, and 413 are in the DOWN state, the switch 410 may initialize a timer, and start counting of the timer (S640). The first switch 410 may determine whether the link statuses of all the ports 410-1, 410-2, and 410-3 connected to the end nodes 411, 412, and 413 are maintained as DOWN state during a predetermined period of time by using the tin S650). In case that at least one of link statuses of the ports 410-1, 410-2, and 410-3 is changed to UP state during the predetermined period of time, the second switch 420 may perform the steps S620 to S650 again.

On the contrary, in the case that the link statuses of all the ports 410-1, 410-2, and 410-3 connected to the end nodes 411, 412, and 413 have been maintained as DOWN state during the predetermined period of time, the first switch 410 may operate in the low-power mode (S660). That is, the operation mode of the first switch 410 may be changed from the normal mode to the low-power mode. Like this, the first switch 410 may change its operation mode based on the link statuses of it ports connected to the end nodes 411, 412, and 413 without analyzing information included in a NM frame.

In the below description, an operation mode transition method performed in a communication node constituting the vehicle network topology explained referring to FIG. 4 will be explained. An operation mode transition of a switch among communication nodes may be performed by the method explained referring to FIG. 6.

Figure 7:
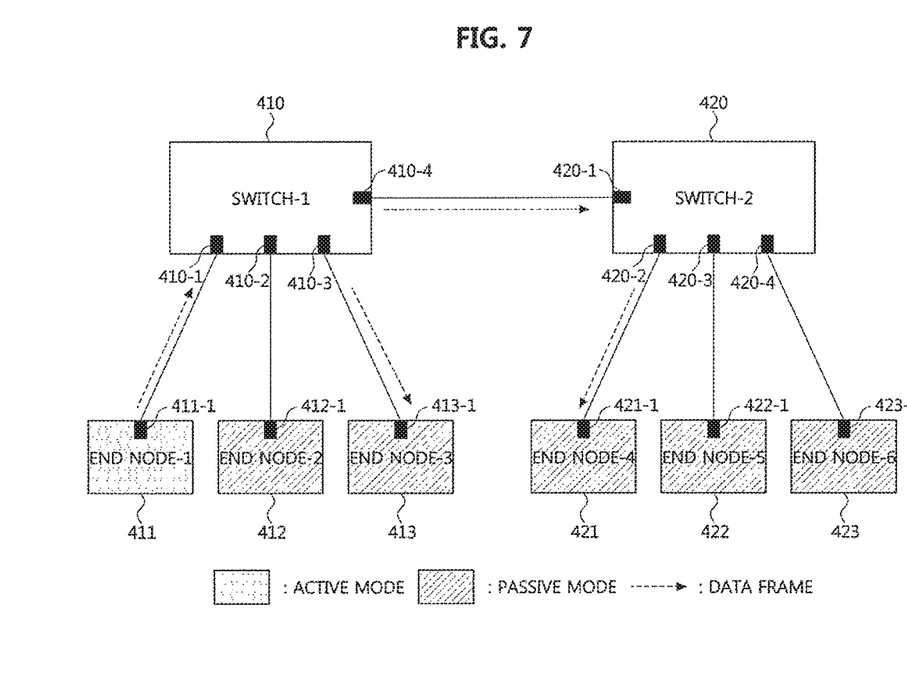
FIG. 7 is a block diagram illustrating a first example of an operation mode of a communication node in a vehicle network.

FIG. 7 is a block diagram illustrating a first example of an operation mode of a communication node in a vehicle network according to an exemplary embodiment of the present disclosure.

Referring to FIG. 7, the end node 411 wanting to transmit data may operate in active mode, and other end nodes 412, 413, 421, 422, and 423 may operate in passive mode. The end node 411 may transmit a data frame to the first switch 410. The first switch 410 may receive the data frame from the end node 411 through the port 410-1, transmit the received data frame to the end node 413 through the port 410-3, and transmit the received data frame to the second switch 420 through the port 410-4. The end node 413 may receive the data frame from the first switch 410. The second switch 420 may receive the data frame from the first switch 410 through the port 420-1, and transmit the received data frame to the end node 421 through the port 420-2.

Since the end nodes 411, 412, and 413 operate in active mode or passive mode, signals can be transmitted or received through the ports 410-1, 410-2, and 410-3. Accordingly, the first switch 410 may identify the link statuses of the respective ports 410-1, 410-2, and 410-3 as UP states. Also, since the end nodes 421, 422, and 423 operate in passive mode, signals can be transmitted or received through the ports 420-2, 420-3, and 420-4. Accordingly, the second switch 420 may identify the link statuses of the respective ports 420-2, 420-3, and 420-4 as UP states.

After completion of the data frame transmission, the operation mode of the communication node will be explained in the below description.

Figure 8:
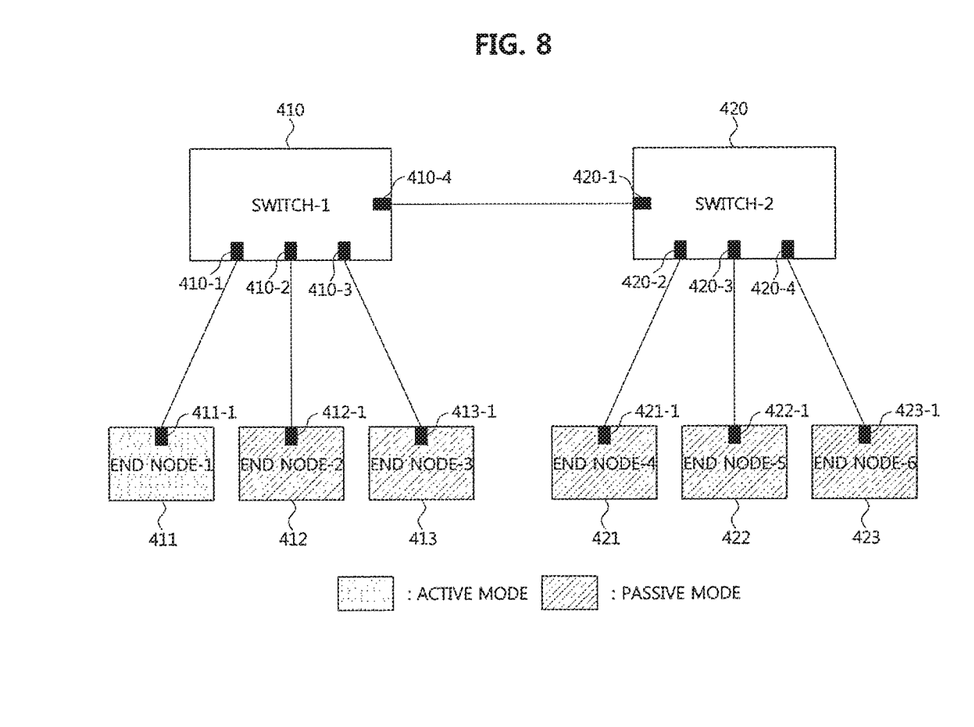
FIG. 8 is a block diagram illustrating a second example of an operation mode of a communication node in a vehicle network.
Figure 9:
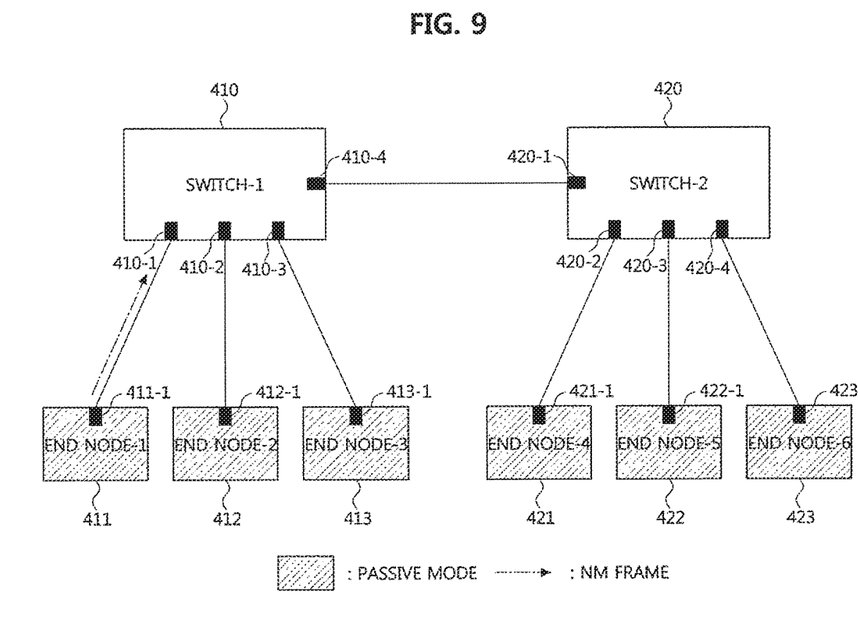
FIG. 9 is a block diagram illustrating a third example of an operation mode of a communication node in a vehicle network.

FIG. 8 is a block diagram illustrating a second example of an operation mode of a communication node in a vehicle network according to an exemplary embodiment of the present disclosure, and FIG. 9 is a block diagram illustrating a third example of an operation mode of a communication node in a vehicle network according to an exemplary embodiment of the present disclosure.

Referring to FIG. 8 and FIG. 9, when the end node 411 has no data to transmit, the end node 411 may generate a NM frame indicating that the end node 411 will operate in passive mode, and transmit the generated NM frame. After transmission of the NM frame, the end node 411 may operate in passive mode. Other end nodes 412, 413, 421, 422, and 423 except the end node 411 may operate in passive mode.

Since the end nodes 411, 412, and 413 operate in active mode or passive mode, signals can be transmitted or received through the ports 410-1, 410-2, and 410-3. Accordingly, the switch 410 may identify the link statuses of the respective ports 410-1, 410-2, and 410-3 as UP states. Further, since the end nodes 421, 422, and 423 operate in passive mode, signals can be transmitted or received through the ports 420-2, 420-3, and 420-4. Accordingly, the switch 420 may identify the link statuses of the respective ports 420-2, 420-3, and 420-4 as UP states.

After the end node 411 enters the passive mode, the operation mode of the communication node will be explained in the below description.

Figure 10:
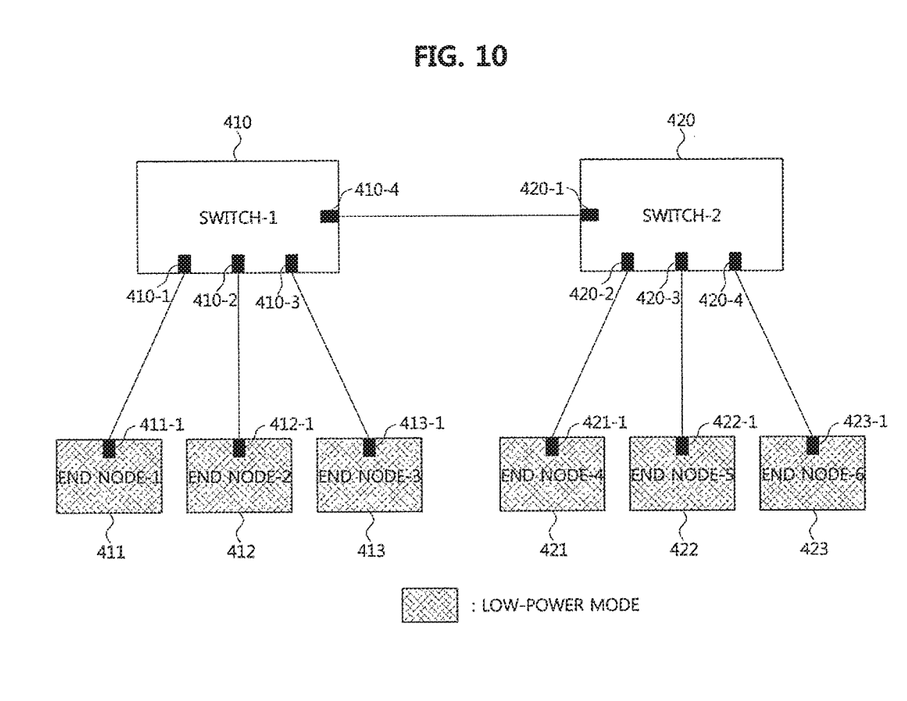
FIG. 10 is a block diagram illustrating a fourth example of an operation mode of a communication node in a vehicle network.

FIG. 10 is a block diagram illustrating a fourth example of an operation mode of a communication node in a vehicle network according to an exemplary embodiment of the present disclosure.

Referring to FIG. 10, each of the end nodes 411, 412, 413, 421, 422, and 423, when is has no data to transmit or receive, may operate in low-power mode. For example, each of the end nodes 411, 412, 413, 421, 422, and 423 may receive a NM frame requesting it to operate in low-power mode from an upper level communication node, and operate in low-power mode according to the NM frame. The end nodes 411, 413, 421, 422, and 423 may put its link to DOWN state.

Meanwhile, since the end nodes 411, 412, and 413 operate in low-power mode, the first switch 410 may determine respective links of the ports 410-1, 410-2, and 410-3 as DOWN state. The first switch 410 may determine whether the link statuses of all the ports 410-1, 410-2, and 410-3 are maintained as DOWN state during a predetermined period of time. Also, since the end nodes 421, 422, and 423 operate in low-power mode, the second switch 420 may determine link statuses of the ports 420-2, 420-3, and 420-4 as DOWN state. The second switch 420 may determine whether the link statuses of all the ports 420-2, 420-3, and 420-4 are maintained as DOWN state during a predetermined period of time.

In case that link statuses of all the ports 410-1, 410-2, 410-3, 420-2, 420-3, and 420-4 are maintained as DOWN state, the operation mode of the communication node will be explained in the below description.

Figure 11:
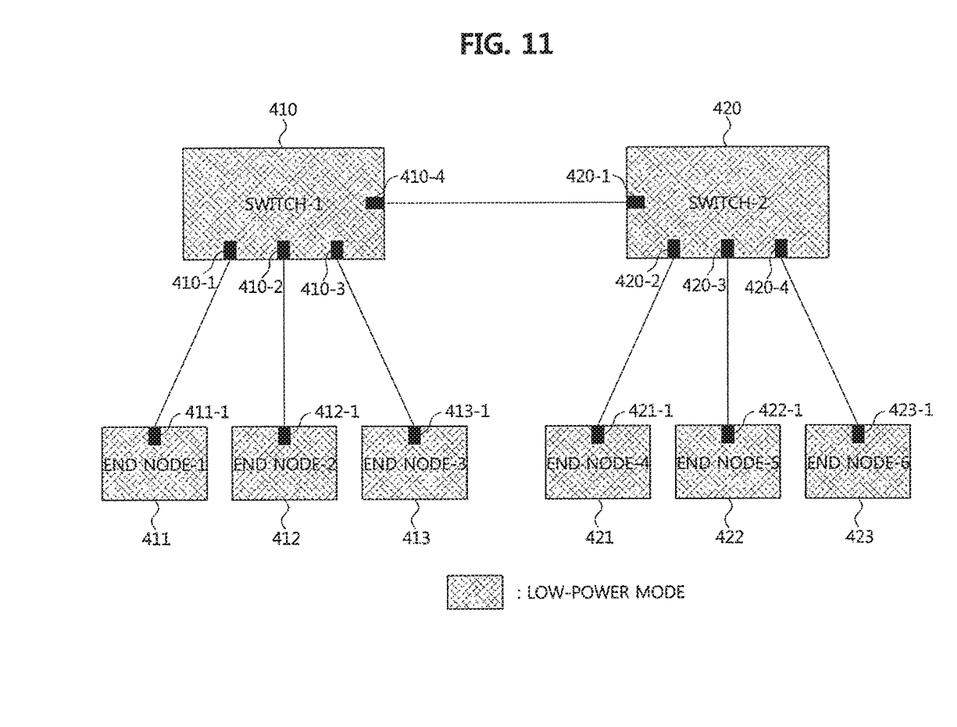
FIG. 11 is a block diagram illustrating a fifth example of an operation mode of a communication node in a vehicle network.

FIG. 11 is a block diagram illustrating a fifth example of an operation mode of a communication node in a vehicle network according to an exemplary embodiment of the present disclosure.

Referring to FIG. 11, in the case that link statuses of all the port 410-1, 410-2, and 410-3 have been maintained as DOWN state during the predetermined period of time, the switch 410 may change its operation mode from normal mode to low-power mode. When link statuses of all the port 420-2, 420-3, and 420-4 have been maintained at the DOWN state during the predetermined period of time, the switch 420 may change its operation mode from a normal mode to a low-power mode. Therefore, all of the communication nodes 410, 411, 412, 413, 420, 421, 422, and 423 may operate in low-power mode.

The methods according to forms of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the forms of the present disclosure and their advantages have been described in detail above, it should be understood that various changes, substitutions and alterations may be made herein without departing from the scope of the disclosure.

What is claimed is:

1. An operation method of a switch apparatus in an Ethernet-based vehicle network, the method comprising:
   obtaining, by a processor, configuration information of communication nodes connected to the switch apparatus;
   identifying, by the processor, ports connected to end nodes among the communication nodes based on the configuration information;
   identifying, by the processor, link statuses of the ports; and
   when the link statuses of the ports are a DOWN state during a predetermined period of time, changing, by the processor, an operation mode of the switch apparatus from the normal mode to a low-power mode.

2. The operation method according to claim 1, wherein the configuration information includes Medium Access Control (MAC) addresses, port identifiers, and node-type information of the communication nodes.

3. The operation method according to claim 2, wherein the node-type information indicates whether a corresponding communication node is the switch apparatus or an end node.

4. The operation method according to claim 1, wherein the configuration information is obtained based on address resolution protocol (ARP).

5. The operation method according to claim 1, wherein the obtaining configuration information comprises:
   receiving a frame including the configuration information from a communication node in an upper level; and
   obtaining the configuration information from the frame.

6. The operation method according to claim 1, wherein the obtaining configuration information comprises:
   transmitting request frames requesting the configuration information to the communication nodes connected to the switch apparatus;
   receiving response frames including the configuration information in response to the request frames; and
   obtaining the configuration information from the response frames.

7. The operation method according to claim 1, wherein the switch apparatus does not support a network management protocol.

8. The operation method according to claim 1, wherein the switch apparatus comprises a layer-1 and a layer-2.

9. The operation method according to claim 1, wherein, when an end node connected to the switch apparatus receives a frame requesting to operate in the low-power mode, a link status between the switch apparatus and the end node is set to the DOWN state.

10. The operation method according to claim 1, further comprising constructing a database in which the configuration information is stored.

11. The operation method according to claim 1, further comprising changing the operation mode of the switch apparatus from the low-power mode to the normal mode, when a link status of at least one of the ports connected to the end nodes is changed from the DOWN state to an UP state.

12. A switch apparatus constituting a vehicle network comprising a processor and a memory storing at least one instruction executed by the processor, wherein the execution of the at least one instruction causes the processor to:
   obtain configuration information of communication nodes connected to the switch apparatus;
   identify ports connected to end nodes among the communication nodes based on the configuration information;
   identify link statuses of the ports; and
   change an operation mode of the switch apparatus from a normal mode to a lower power mode, when the link statuses of the ports are a DOWN state during a predetermined period of time.

13. The switch apparatus according to claim 12, wherein the configuration information includes Medium Access Control (MAC) addresses, port identifiers, and node-type information of the communication nodes.

14. The switch apparatus according to claim 13, wherein the node-type information indicates whether a corresponding communication node is the switch apparatus or an end node.

15. The switch apparatus according to claim 12, wherein the configuration information is obtained based on address resolution protocol (ARP).

16. The switch apparatus according to claim 12, wherein the switch apparatus does not support a network management protocol.

17. The switch apparatus according to claim 12, wherein the at least one instruction is further configured to construct a database in which the configuration information is stored.

18. The switch apparatus according to claim 12, wherein the at least one instruction is further configured to change the operation mode of the switch apparatus from a low-power mode to a normal mode, when a link status of at least one of ports connected to the end nodes is changed from the DOWN state to an UP state.

* * * * *